United States Patent [19]

Harand et al.

[11] 4,036,561

[45] July 19, 1977

[54] PRIMARY COOLANT PUMP FOR NUCLEAR REACTORS

[75] Inventors: Elmar Harand, Hochstadt; Gerd Richter, Nurnberg; Günter Tschöpel, Erlangen, Tennenlohe, all of Germany

[73] Assignee: Kraftwerk Union Aktiengesellschaft, Mulheim, Germany

[21] Appl. No.: 501,337

[22] Filed: Aug. 28, 1974

[30] Foreign Application Priority Data

Sept. 6, 1973 Germany .......................... 2345081

[51] Int. Cl.$^2$ .......................... B27C 9/00; G21C 9/00
[52] U.S. Cl. .......................... 415/18; 176/38; 176/61; 415/123; 417/214
[58] Field of Search .......................... 415/123, 18; 417/214; 176/37, 38, 61, 50; 188/170

[56] References Cited

U.S. PATENT DOCUMENTS

| 2,987,296 | 6/1961 | Ferguson | 415/18 |
| 3,123,282 | 3/1964 | Pothier et al. | 415/18 |
| 3,329,399 | 7/1967 | Roper | 415/18 |
| 3,700,552 | 10/1972 | Schluderberg | 176/50 |

Primary Examiner—Carlton R. Croyle
Assistant Examiner—G. P. La Pointe
Attorney, Agent, or Firm—Kenyon & Kenyon, Reilly, Carr & Chapin

[57] ABSTRACT

The primary coolant pump of a nuclear reactor, which is usually driven electrically, can be accelerated in the event of a line break by the escaping coolant to such an extent that its mechanical strength is in jeopardy due to overspeed. According to the invention, a brake and/or shut-off means, which can be controlled by the pump pressure differential or the pump speed, are associated with the pump. The invention is of interest particularly for pressurized-water reactors.

2 Claims, 11 Drawing Figures

PRIMARY COOLANT PUMP FOR NUCLEAR REACTORS

BACKGROUND OF THE INVENTION

The invention concerns a main coolant pump for nuclear reactors with a particularly electric, drive motor and a housing which contains the pump impeller. Such pumps drive the coolant of the nuclear reactor through the reactor pressure vessel with the reactor core, where nuclear heat is generated, and then through a cooling loop which is located outside the reactor pressure vessel and transmits the heat, for instance, for the generation of steam. In pressurized-water reactors, for which the invention is primarily of interest, the coolant is water which is under a pressure of, for instance, 150 bar.

If a leak occurs in such a nuclear reactor in a coolant line associated with the primary coolant pump, the coolant escapes with great velocity. Under unfavorable conditions, a flow can therefrom develop in the pump, for which the pump impeller acts as a turbine, so that the pump is accelerated by the escaping coolant. If the leak occurs in the cooling loop between the pump and the pressure vessel, the pump's impeller which normally circulates the coolant in that direction, can be accelerated in its normal rotative direction, to abnormal rotative speeds. If the leak occurs in the loop on the other side of the pump, counter to the pump's normal coolant circulating direction, the pump's impeller is first decelerated to a stop and then driven in a rotative direction counter to its normal rotative direction, and possibly to abnormal rotative speeds. This reversal and reverse driving of the impeller, can occur in a matter of seconds, because the pump's rotative mass is small compared to the volume and high pressure of the pressurized-water coolant in the pressure vessel and cooling loop. This can go so far in case of an extensive leak, that overspeed leads to jeopardizing the mechanical strength of the pump. A particular danger here is that not only damage to the pump itself is involved, but above all that pump parts that may be flung off by centrifugally-explosive speeds, can damage important components of the nuclear reactor. It is therefore an object of the invention to seek remedial action for the case described.

SUMMARY OF THE INVENTION

The invention provides that a brake and/or a shut-off means is associated with the pump and that the brake and the shut-off means are controlled by parameters of the pump operation, preferably the pump pressure or the pump speed used as indicators and to which the brake and/or shut-off means are responsive automatically. As has been found, reliable protection can be obtained in this manner with relatively little expenditure of means, against a dreaded run-away of the pump, as the brake and/or the shut-off organ act on the pump, i.e., where the cause of the danger is located, and they can be set in operation automatically by the parameters of the pump operation without detour and often even without external energy.

On one advantageous embodiment of the invention, the pump impeller comprises a centrifugal brake. The brake acts directly as a function of the pump speed, the braking force acting on the part to be decelerated, namely, the pump impeller, without detour. The centrifugal brake can cooperate here directly with the pump housing itself. However, separate braking devices can also be provided.

Another possibility to decelerate the pump running at overspeed is to associate with the pump impeller a braking ring which is arranged at the pump housing and can be adjusted by the pressure in the pump housing. As the danger of the pump running away exists if the normal pressure conditions in the pump change, particularly for the reason that the pressure on the intake side of the pump becomes suddenly larger than on the output or pressure side, a pressure difference suitable for the response of the brake can be obtained relatively simply. Usually, the structural parts already existing in the pump suffice for generating a sufficient pressure difference. In the case of very large pumps it may be advisable to cause hydraulic amplification of the pressure force, in order to control a large braking force when no great overspeed exists yet, but is potential, so that the pump is arrested reliably or at least is loaded to the extent that overspeed is not possible.

As brakes can be used not only friction brakes of conventional design, in which materials with high friction resistance and low wear are to be paired, but a turbine acted upon by a pressure medium can also be used as a brake. The turbine provides a force in the counterdirection and thereby takes care of the desired deceleration of the pump impeller.

In all the arrangement considered so far, the energy impressed on the pump by the coolant was annihilated in a brake. Another possibility, which can be combined with the above-mentioned possibilities but can also be used effectively alone, is to interrupt the coolant flow leading to an acceleration of the pump; a slider movable along the axis of the pump impeller may be arranged on the latter. The slider, which is movable along the axis, requires only small control forces. It may be designed to particular advantage, cylindrically and mounted concentric to the impeller axis. In this case, no forces need to be taken into consideration which might push the slider against its seat and thereby cause high operating forces. Therefore, a pressure produced at the pump is sufficient, at least in most cases, to operate the slider, so that automatic operation is again obtained with little expenditure of means.

Several examples of embodiments will be described in the following to explain the invention further, making reference to the attached drawings.

BRIEF DESCRIPTION OF THE DRAWINGS

Various preferred modes for carrying out the invention are illustrated by the accompanying drawings, in which.

DETAILED DESCRIPTION OF THE INVENTION

Figure 1:
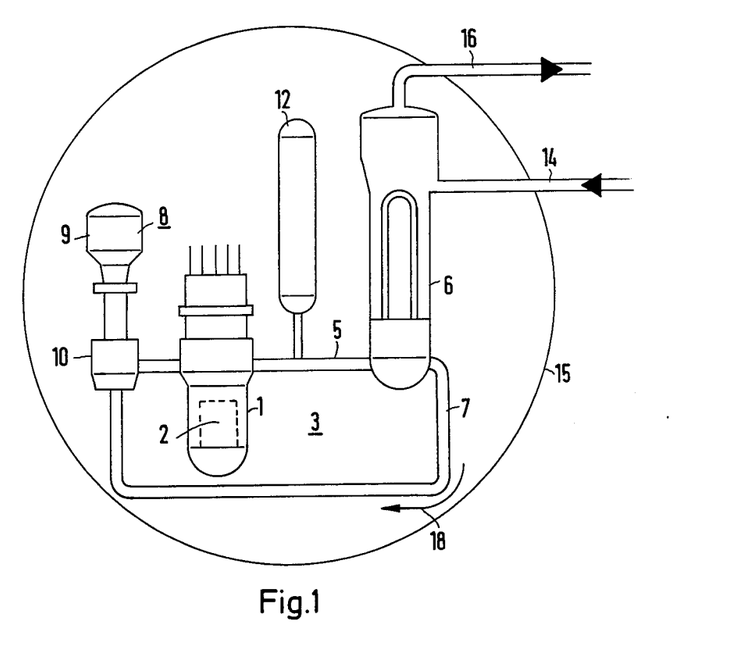
FIG. 1 shows a pressurized-water reactor installation illustrating the use of the primary coolant pump.

In FIG. 1, a nuclear reactor installation with a pressurized water reactor is shown in somewhat simplified form. It comprises a reactor pressure vessel 1 with the reactor core 2, as well as an external primary coolant loop 3 connected to the reactor pressure vessel. Part of the primary coolant loop 3 is the so-called hot leg 5, which leads from the reactor pressure vessel 1 to a steam generator 6. The so-called cold leg 7 leading away from the steam generator 6 contains a primary coolant pump 8, which consists of an electric motor 9 and a centrifugal pump 10. At the hot leg 5 is mounted a pressurizer 12, which takes care of maintaining in the primary coolant loop the desired operating pressure of, for instance, 160 bar. The steam generator 6 is supplied on the secondary side with feed water via a line 14, which leads through the containment 15. The containment 15 encloses all radiation-exposed parts of the nuclear reactor installation. Through it leads furthermore a steam line 16 going from the steam generator 6 to a turbine (not shown).

In normal operation the light water used as the primary coolant flows under the action of the pump 8 in the direction of the arrow 18 through the reactor pressure vessel 1 and the primary cooling loop 3. The speed of the pump is determined here by the electric motor 9. If however, a leak occurs at any point in the primary cooling loop, the flow through the pump can be increased or reversed depending on the location of the leak in the loop; the primary cooling water, which is under high pressure, flows out from the cooling loop into the leak. In this process, the cooling water also can exert an accelerating action on the pump impeller, which is greater than the driving force of the electric motor 10 and can therefore lead to dangerous overspeed.

Figure 2:
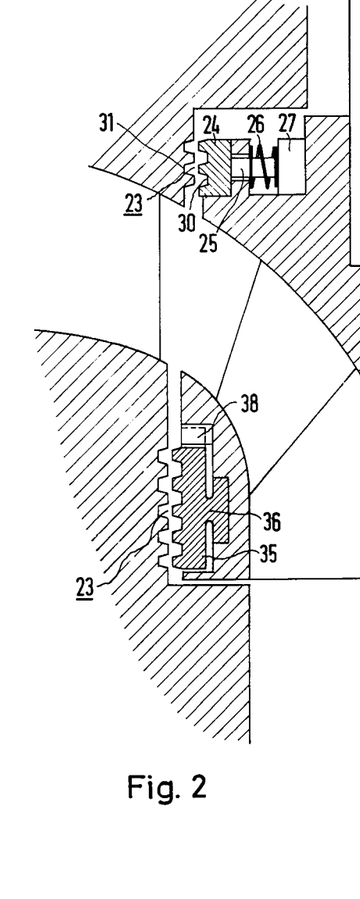
FIG. 2 in vertical section shows one mode and a modification applied to the same pump.

In FIG. 2 is shown as a remedy that several braking devices 23 are associated with a pump impeller 20, which is supported by a pump shaft 21 in a pump housing 22, of which only parts are shown. Thus, there are provided in the upper part of the pump impeller 20, distributed symmetrically over its circumference, brake shoes 24 and 24', which are secured by guide pins 25, 25' and occupy the end position shown, under the action of springs 26, 26'. Each spring is braced here against its spring disc 27, 27', which is firmly connected with the pin 25. If in the case of trouble the speed of the pump impeller 20 increases, the centrifugal forces which are exerted by the brake shoes then finally overcome the force of the springs 26, 26', regardless of the direction of rotation. Thereby, the braking surfaces 30, 30' which are in part designed in the shape of wedges and rotate with the pump impeller 20, come in contact with correspondingly shaped matching surfaces 31, 31' in the stationary pump housing 22. The pump 10 is thereby decelerated, so that the speed cannot increase further. The maximum speed is thus determined by the centrifugal force exerted on the brake shoes 24 and the force of the spring 26 opposing it.

At the left-hand lower end of the pump impeller 20, an additional embodiment of a centrifugal brake is depicted. Here, the brake shoe 35, which may also reach around the entire circumference of the pump impeller 20 in the form of individual elements or as a closed ring, is held by an annular shear pin 36, which has a defined holding force. If the centrifugal force exerted by the brake shoe exceeds the holding force of the shear pin 36, which occurs at a given speed, the braking action sets in immediately until the pump 10 is completely braked, because in contrast to the embodiment described above, the restoring action of the spring 26, 26' is absent. The braking force can be transmitted here by teeth 38 from the brake shoes 35 to the pump impeller 20.

Figure 2A:
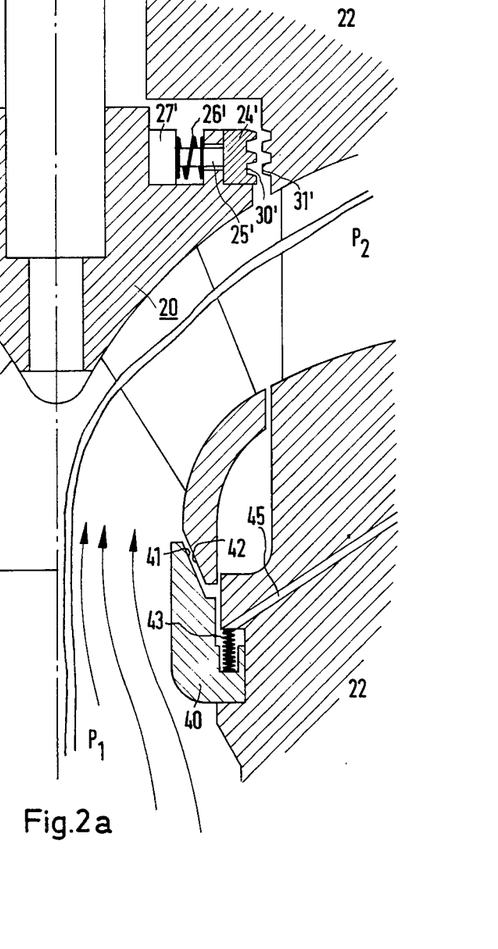
FIG. 2a shows another mode, also in vertical section.

A still different embodiment is shown in FIG. 2a. Here, a brake ring 40 is associated with the pump housing 22, whose conical braking surfaces 41 can cooperate with a fitting conical braking surface 42 of the pump impeller. The brake ring 40 is movably guided in the pump housing 22 in the direction of the pump shaft 21, but is secured in the peripheral direction. It is acted upon by a spring 43 with a definite force. Only when the force of this spring 43 is overcome, because the difference between the pressure $P_1$ at the pump inlet or intake passage, and the pressure $P_2$ at the output passage or outlet of the pump, which acts on the brake ring 40, is greater than the restoring force of the spring 43, the brake ring 40 is moved and thereby becomes effective. However, this pressure difference can have a positive value, which actuates the brake, only if the pump no longer acts as the driving means for the cooling water flow. Normally, however, the suction pressure $P_1$ is smaller than the output pressure $P_2$. The equalization hole 45 provided in the housing 22 takes care that the pressure $P_2$ (output pressure) prevails. 51

Figure 3:
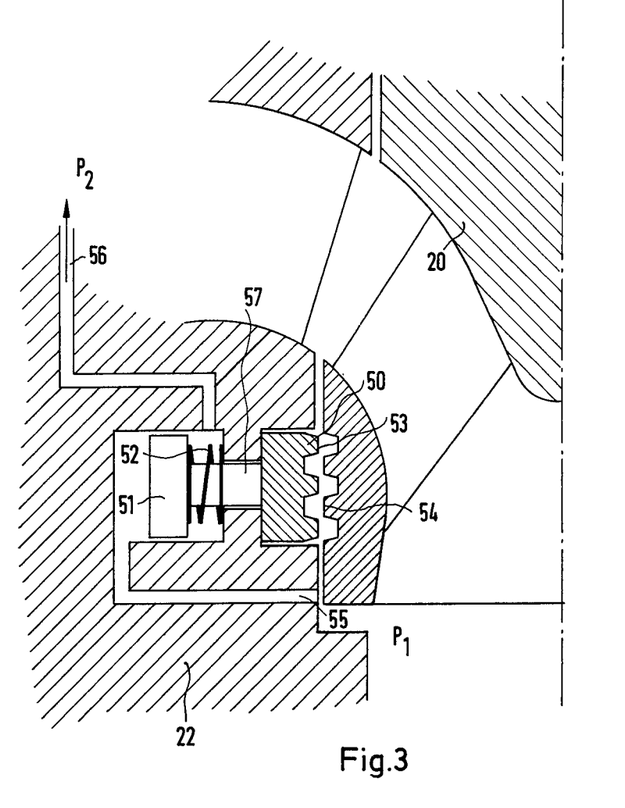
FIG. 3 provides another example, in vertical section.

In the embodiment example according to FIG. 3, a brake shoe 50 attached to the pump housing 22 is operated hydraulically by a piston 51 against the action of a spring 52, so that the braking surface 53 of the brake shoe comes into engagement with a matching brake surface 54 of the pump impeller. The force acting on the piston 51 is given by the product of the area of the piston 5 and the pressure difference between the suction pressure $P_1$ and the output pressure $P_2$. The suction pressure is pushed through a hole 55 to the side of the piston 51 which is facing away from the brake shoe 50. In the opposite direction, the piston is put under pressure by a canal or duct 56. The area of the push rod 57 between the brake shoe 50 and the piston 51 is neglected here. Several brakes with brake shoes 50 and pistons 51 can again be distributed uniformly over the circumference of the pump.

Figure 4:
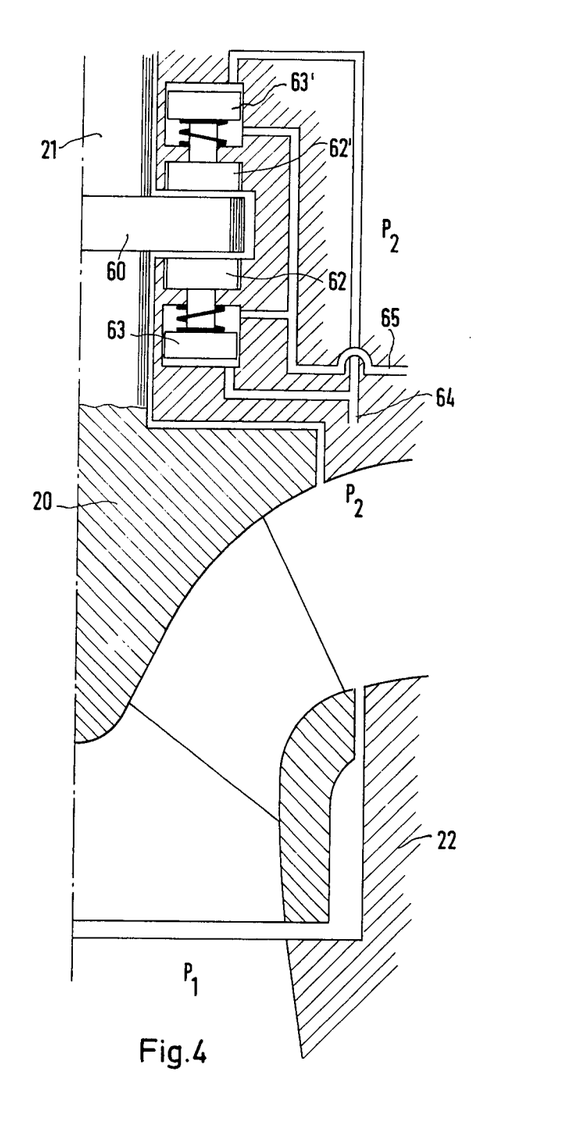
FIG. 4 shows a further modification, in vertical section.

In FIG. 4 an embodiment is depicted, in which the braking force is not applied directly to a suitable part of the impeller, but to a brake disc 60 which is connected to the pump shaft 21. The brake shoes 62, 62' which are arranged symmetrically opposed are operated by pistons 63, 63' as in the embodiment examples according to FIG. 3, as a function of the pressure difference which exists between the intake and output. For this purpose, a canal 64 leads to the suction side with the pressure $P_1$, and a canal 65 leads to the pressure side with the pressure $P_2$.

Figures 5, 6, 7:
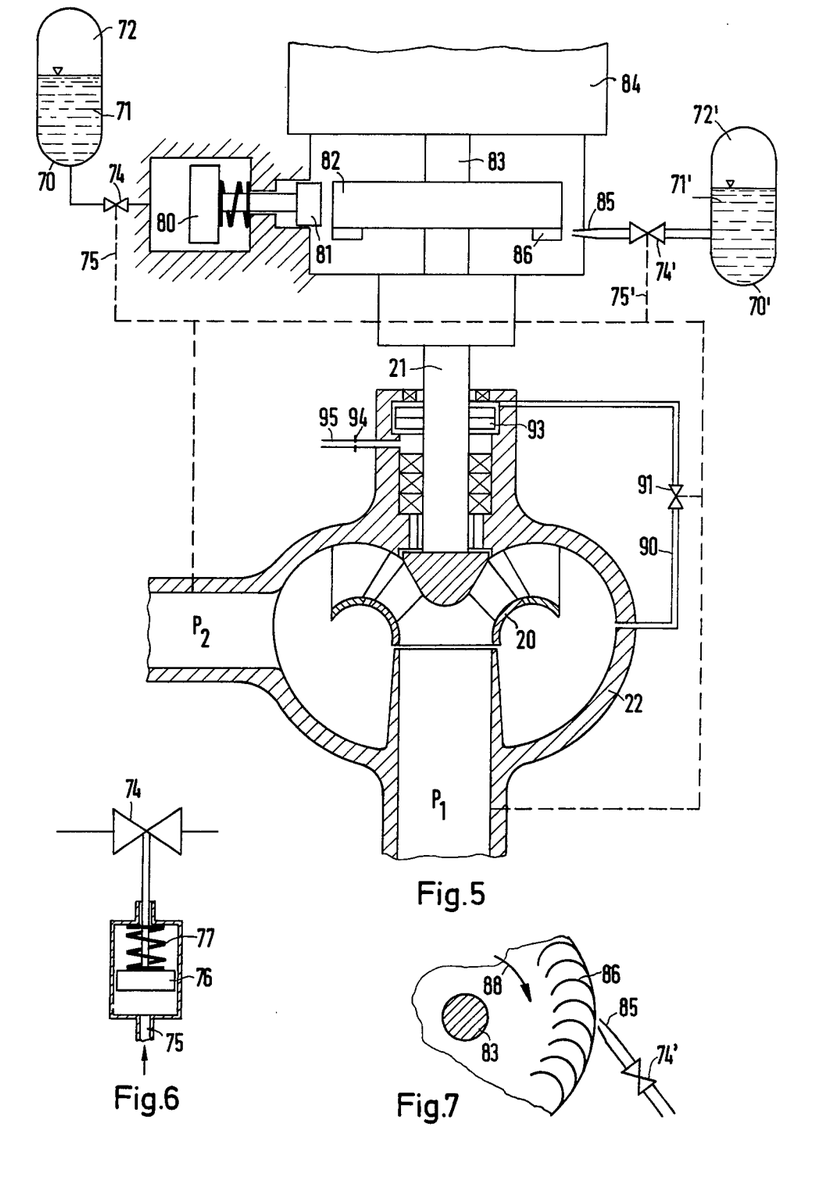
FIG. 5 in vertical section schematically shows still another example.
FIG. 6 in longitudinal section schematically shows a detail of FIG. 5.
FIG. 7 is horizontal section schematically shows another detail of FIG. 5.

FIG. 5 shows that the pressure difference between the pressure $P_1$ in the suction side and the pressure $P_2$ on the pressure side of the pump can also be used to control hydraulically operated braking devices. For this purpose, valves 74, 74', which are shown enlarged in FIG. 6, are each associated with high-pressure accumulators 70, 70' which contain in a manner known per se hydraulic oil under the pressure of a gas cushion 72, 72'. As can be seen, lines 75, 75' lead to the side facing away from the valve 74, 74', of a piston 76, which is under the action of a spring 77. The valve 74 is therefore opened if the pressure in the line 75 drops below a definite value, which occurs in case of a break of the primary coolant lines. In this case, the oil 71 of the high-pressure accumulator 70 is admitted, in the embodiment shown in the left side of FIG. 5, to the piston 80 of a hydraulically operated brake 81, which is pressed against the flywheel 82, which is connected with the shaft 83 of the pump motor 84.

On the right side of FIG. 5, the opening of the valve 74' causes the oil 71' to flow out through a nozzle 85, by which it is directed toward vanes 86 at the flywheel 82. This produces a turbine action in the braking direction, as shown in FIG. 7 in a section. It will be seen that the nozzle 85 aims the high-pressure oil, after the valve 74' is opened, against the direction of rotation indicated by the arrow 88 toward the vanes 86 which are arranged at the circumference of the flywheel 82. The pump shaft is again designated with 83.

For the case that very large pressure differences occur, the last-described turbine brake can be realized by means of a line 90 with a valve 92 controlled in dependence on the pressure, also with the primary coolant as the pressure medium. As is shown additionally on the right side of FIG. 5, this pressure medium is conducted from the pump housing 22 to vanes 93 which are attached at the pump shaft 21. Here, a bleeder line 95 equipped with an orifice 94 can be provided, so that no counterpressure to the braking action is generated.

Figure 8:
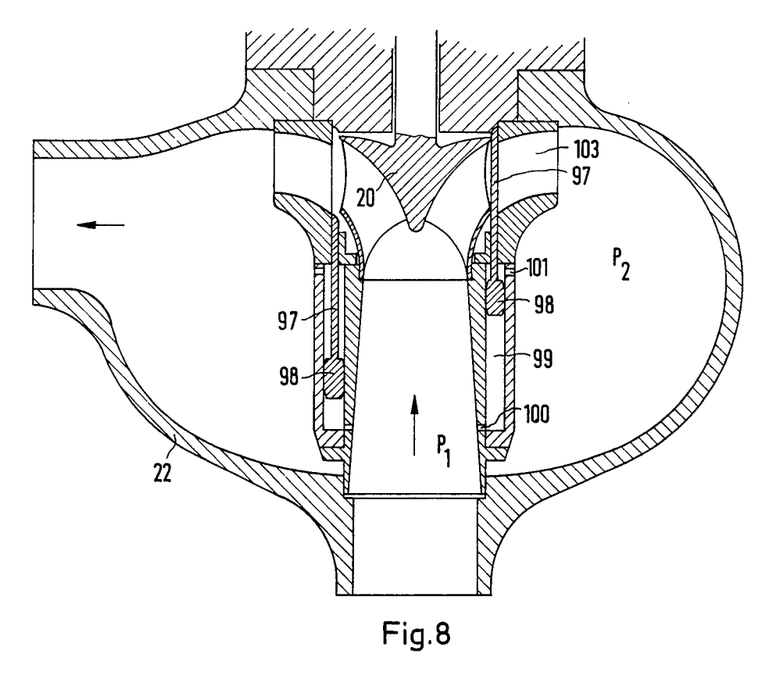
FIG. 8 in vertical section shows an example wherein the flow is closed off.

In FIG. 8 can be seen in a cross section through the pump housing 22 that there is associated with the pump impeller 20 a cylindrical slider 97, which is of rotation-symmetrical design and is arranged concentrically to the longitudinal axis of the pump impeller 20. The slider carries a ring piston 98 at a lower end facing the suction side of the pumps. An associated ring cylinder 99 is connected via holes 100 with the suction side of the pump, so that for all practical purposes the pressure $P_1$ exists there. Holes 101 at the upper end of the cylinder 99, which lead to the interior of the pump housing 22, take care that the pressure $P_2$ prevails on the other side of the ring piston 98. Thus, the slider 97 is automatically brought into the closing position between the pump impeller 20 and a stationary guide wheel 103, as can be seen on the right-hand side of FIG. 8, if the pressure conditions change in the event of a break of the primary line.

Figure 9:
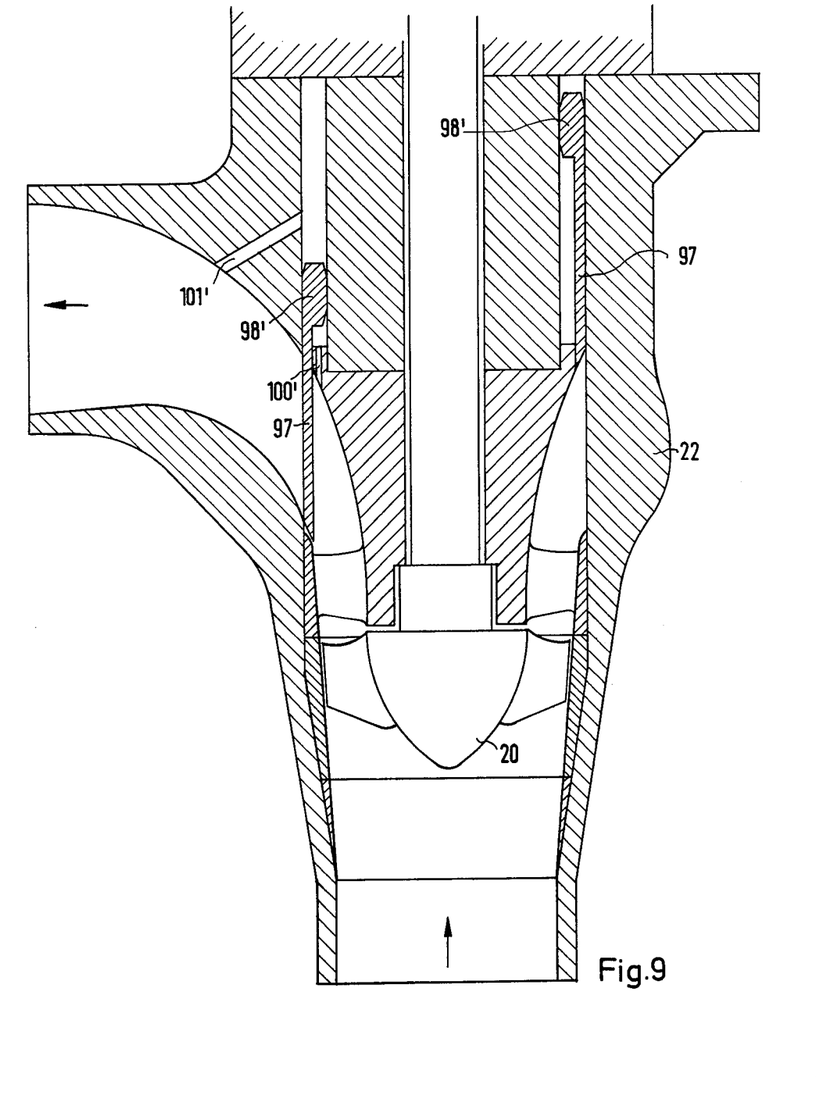
FIG. 9 in vertical section shows a modification of FIG. 8.

In FIG. 9 is shown that the slide 97 can also be actuated by a driving piston 98' which is located at the end of the pump impeller 20 facing away from the suction side. The lines necessary to operate the piston are designated with 101' and 100'.

Figure 10:
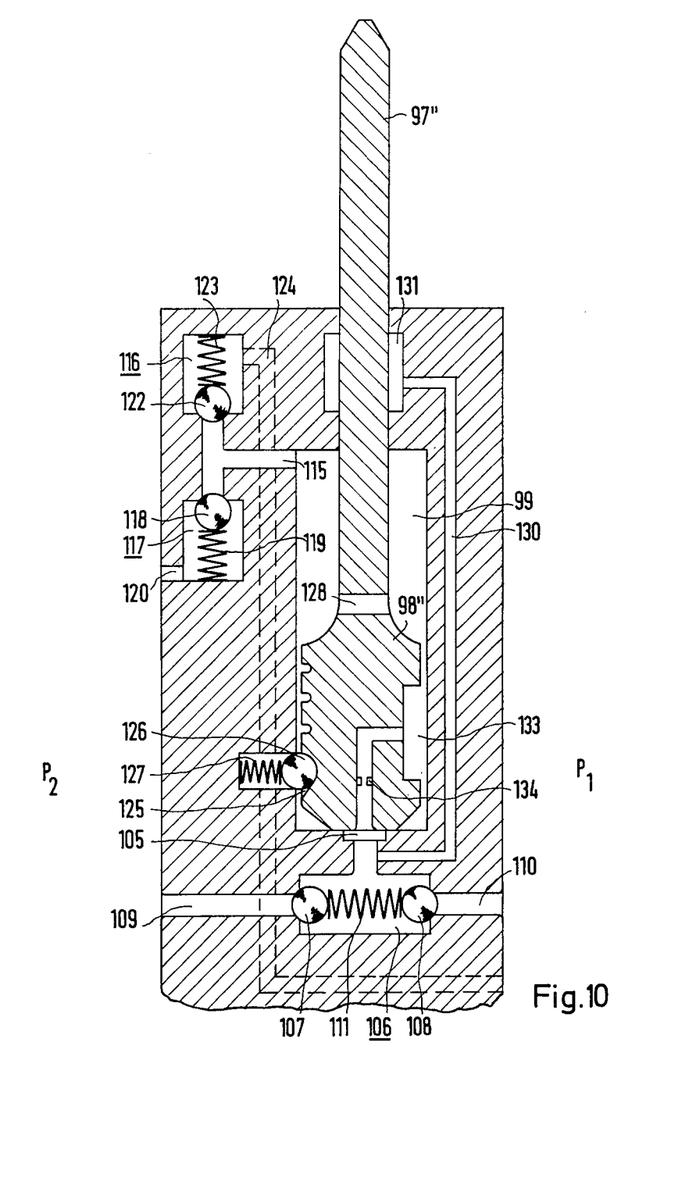
FIG. 10 in vertical section schematically shows a modification of the examples of FIGS. 8 and 9.

In FIG. 10 is shown on a larger scale the driving piston 98" for a slider 97", which is acted upon by means of ball valves in such a manner that it maintains the once assumed closed position regardless of the pressure then prevailing in the pump. As will be seen, an inlet 105 is provided at the lower end of the associated cylinder 99, which is provided with a dual check valve 106. For this purpose, two spheres 107 and 108 are associated with two feed lines 109 and 110, against which they are pressed by a common spring 111. The feed line 109 leads to the pressure stub, where the pressure $P_2$ prevails, while the line 110 leads to the suction stub with the pressure $P_1$.

The upper discharge side of the cylinder 99 has an outlet 115, which is conducted via two check valves 116 and 117. Of these, the check valve 117, which consists of a ball 118 and a spring 119, leads via a line 120 to the region of the output stub of the pump housing 22. There, the pressure $P_2$ prevails again. The check valve 116 with the ball 122 and the spring 123 opens into an equalization line 124 which leads to the suction side with the pressure $P_1$. In addition, the driving piston 98" of the slider 97" has a detent, which consists of a slot 125, a ball 126 and a compression spring 127. The equalization hole 128 in the slider is necessary only if the outflow of the pressure medium displaced when the slider is operated, is impeded. The line 130 between the inlet 105 and a pocket 131 has the purpose to lubricate the slider 97", so that the slider runs more easily. The same purpose is served by a pocket 133 which is formed by an inner circular groove and connects via a choke 134 with the inlet 105.

It is achieved by means of the balls that the slider 97" is acted upon always in the closed position, when a large difference between the suction and the pressure side occurs. As usual, i.e., in normal operation, only a small pressure difference of about 8 to 10 bar is present, one can take care by means of the detent 125, 126, 127 that the slider is open in normal operation. When it is closed, however, it remains in the closed position even if the pressure conditions are changed by the closing.

What is claimed is:

1. A pressurized-water reactor main coolant pump comprising a pump housing having an inlet passage and an outlet passage through which passages the housing is connected in a cold leg of a pressurized water reactor pressure-vessel main cooling loop containing pressurized-water coolant, said housing containing a rotative impeller and the pump having a rotary motor having a normal rotative speed and connected to said impeller to rotate the impeller at said speed to circulate said coolant by a coolant flow normally inwardly through said inlet passage and outwardly through said outlet passage via said housing, a leak in said loop sufficient to cause the pressurized-water coolant discharge through said housing via its said passages at a velocity driving said impeller at a rotative speed greater than said normal rotative speed, causing a reduction in the pressurized-water coolant's pressure at one of said passages relative to the coolant's pressure at the other of said passages, and means automatically responsive to said reduction in pressure for applying a rotative braking force to said impeller; said means comprising at least one non-rotative brake element and a rotative braking surface connected with said impeller to rotate therewith, said brake element being movable from an inoperative position to an operative position where the brake element frictionally engages said surface to brake the impeller against rotation, said brake element having means for normally biasing it to said inoperative position and being movable to said operative position by a piston which is connected to the brake element, said piston being fluid-connected through a valve with a source of fluid pressure for moving the piston so it moves said brake element to its said operative position, said valve being normally closed and having opening means for opening the valve automatically in response to said reduction in pressure.

2. The pump of claim 1 in which said opening means is a biasing means for biasing said valve to open, said valve having a control piston connected thereto and holding the valve normally closed by the control piston being in fluid connection with both of the pump housings said passages and receiving the pressures of said coolant, said reduction of pressure at either of said passages permitting said biasing means to open said valve.

* * * * *